(12) United States Patent
Kandadai et al.

(10) Patent No.: US 12,455,372 B1
(45) Date of Patent: Oct. 28, 2025

(54) PRESENCE DETECTION BASED ON MULTIPLE SENSORS

(71) Applicant: Amazon Technologies, Inc., Seattle, WA (US)

(72) Inventors: Srivatsan Kandadai, Danville, CA (US); Amit Singh Chhetri, Sunnyvale, CA (US); Md Tamzeed Islam, Stow, MA (US); Trausti Thor Kristjansson, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 18/540,641

(22) Filed: Dec. 14, 2023

(51) Int. Cl.
G08B 13/00 (2006.01)
G01S 15/04 (2006.01)
G01S 15/86 (2020.01)
G10L 25/78 (2013.01)

(52) U.S. Cl.
CPC .............. G01S 15/04 (2013.01); G01S 15/86 (2020.01); G10L 25/78 (2013.01)

(58) Field of Classification Search
USPC .... 340/539.14, 539.22, 426.16, 426.19, 438, 340/937, 995.28, 870.11, 902–905, 340/917–918
See application file for complete search history.

(56) References Cited

U.S. PATENT DOCUMENTS

| | | | |
|---|---|---|---|
| 2010/0030578 A1* | 2/2010 | Siddique | G06Q 20/12 705/26.1 |
| 2013/0215116 A1* | 8/2013 | Siddique | G06Q 20/40 705/26.7 |
| 2018/0293221 A1* | 10/2018 | Finkelstein | G06N 20/00 |
| 2020/0077892 A1* | 3/2020 | Tran | G08B 21/02 |
| 2022/0338756 A1* | 10/2022 | Dzhekiev | G10L 25/66 |

OTHER PUBLICATIONS

Chebolu et al., U.S. Appl. No. 18/538,532, "Multi Device-Based Presence Determination," Filed Dec. 13, 2023, 47 pages.

* cited by examiner

Primary Examiner — Daniel Previl
(74) Attorney, Agent, or Firm — Kilpatrick Townsend & Stockton LLP

(57) ABSTRACT

Techniques for presence detection based on multi modal sensors are described. In an example, a computer system determines first data indicating a first prediction of presence detection within a space. The first data is generated based on first sensor data. The computer system determines second data indicating a second prediction of presence detection within the space. The second data is generated based on second sensor data. The second sensor data is of a different type than the first sensor data. The computer system generates third data indicating a third prediction of presence detection within the space based on the first data, the second data, and a fusion model. The fusion model is configured to generate the third data by at least using associations between presence detections, latent variables, and observed variables. The observed variables correspond to the first data and the second data. The latent variables include sensor-triggering events.

20 Claims, 10 Drawing Sheets

PRESENCE DETECTION BASED ON MULTIPLE SENSORS

BACKGROUND

Different types of devices are available and offer different types of functionalities. For example, a smart speaker may enable voice-based interactions to request music or control other devices. Depending on its type, the device can include different types of sensors. For example, a smart speaker can include a microphone, whereas a smart home device with a display may include a microphone and a camera.

BRIEF DESCRIPTION OF THE DRAWINGS

Various embodiments in accordance with the present disclosure will be described with reference to the drawings, in which.

DETAILED DESCRIPTION

Figure 1:
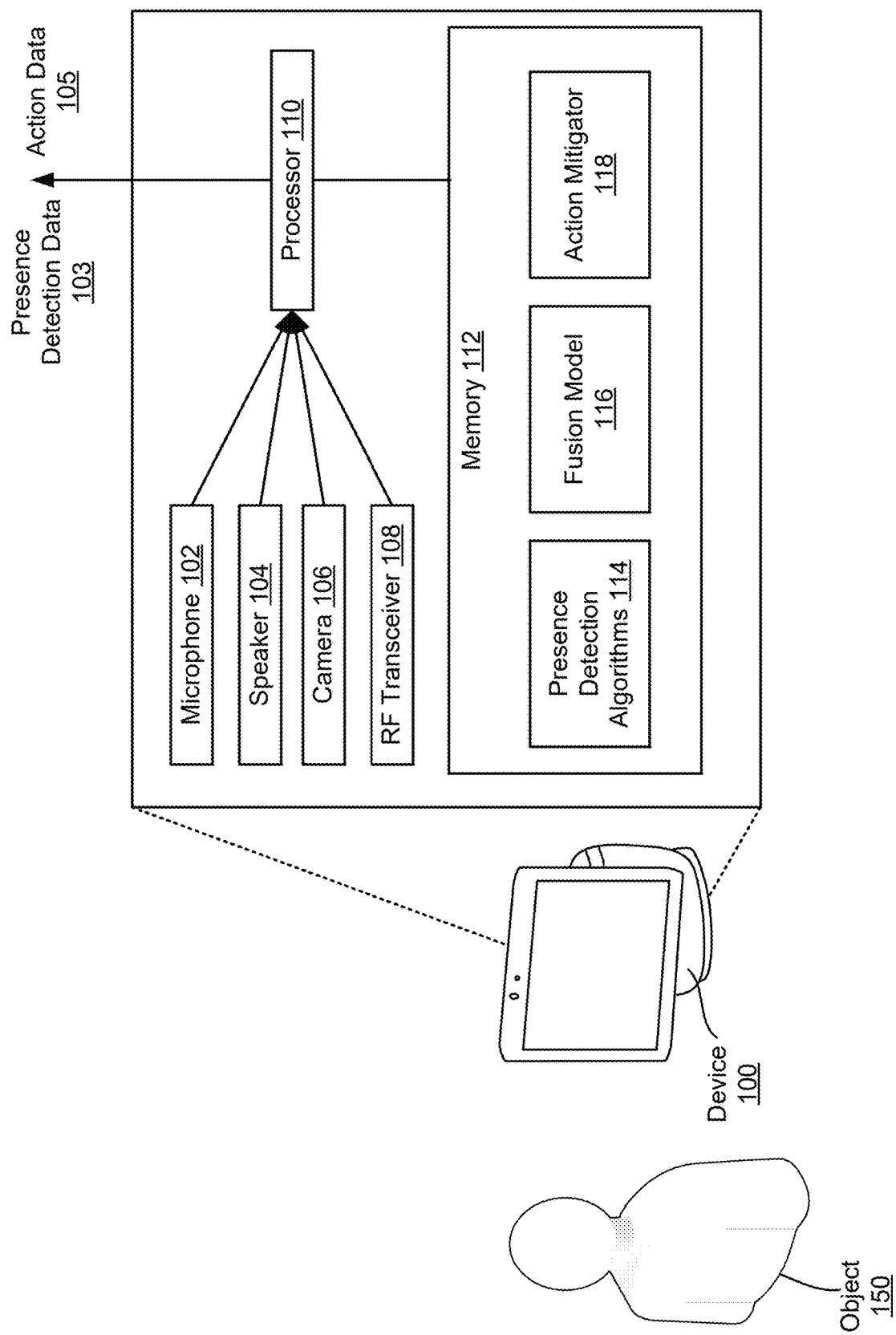
FIG. 1 illustrates an example of presence detection based on multi modal sensors according to an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, presence detection based on multiple sensors. In an example, a device (e.g., a smart home device) includes multiple sensors of different types and may be located within a space. Each sensor can be triggered by a sensor event to generate sensor data. The sensor data can be processed to detect an object presence within the space given the sensor event. For instance, the device may include a microphone and a camera. Given a voice event (e.g., user speech), the microphone can generate audio data. Given a field of view event (e.g., an object entering the field of view of the camera), the camera can generate image data. The first audio data and the image data are examples of different types of sensor data. From each type of sensor data, the device generates presence detection data by using a presence detection algorithm. The presence detection data indicates whether the object presence is detected. This data corresponds to a sensor and includes a prediction (e.g., a likelihood) of the object presence, where the prediction can depend on the sensor-triggering event. Different presence detection algorithms may be used, resulting in different presence prediction data, each indicating a prediction of the object presence. The device uses the different presence prediction data and a fusion model (e.g., a neural network or a graph-based model) to generate fused presence detection data indicating whether the object presence is detected within the space. The fusion model is configured to model associations between latent variables and observed variables. The latent variables correspond to the sensor-triggering events, whereas the observed variables corresponding to the different presence detection data.

To illustrate, consider the example of a smart home device in a kitchen. The smart home device includes a microphone and a camera. A user enters and moves through the kitchen, while having a conversation at a low volume. The microphone generates first audio data corresponding to an audio portion the conversation. The camera generates image data showing the user. The first audio data is input to a first presence detection algorithm that generates first presence detection data indicating that an object presence is detected (e.g., an object is present in the space with an 60% likelihood). The image data is input to a second presence detection algorithm that generates second presence detection data indicating that the object presence is detected (e.g., the object is present in the space with a 90% likelihood). The device implements a dynamic Bayesian network (DBN) as a fusion model. The DBN includes first nodes that represent observed variables, second nodes that represent latent variables, and a third node that represents fused presence prediction data. The observed variables correspond to the first and second presence detection data (e.g., include the 60% and 90% likelihoods). The latent variables correspond to a voice event and a field of view event. The DBN also includes a connection between a first node of the first nodes and a second node of the second nodes, where the first node represents a first observed variable and the second node represents a latent variable. The connection represents a conditional probability of the latent variable (e.g., the voice event or the field of view event) given the observed variable (e.g., the 60% likelihood of the audio data corresponding to the object presence, or the 90% likelihood of the image data corresponding to the object presence). The DBN also includes a connection between the second node and the third node, where this connection represents a conditional probability of the object presence given the latent variable. The fused presence detection data is generated based on a function of the conditional probabilities represented by the connections to the third node. Continuing with the illustrative example, the fused presence detection data indicates that the object presence is detected at a 98% likelihood. Given this likelihood, the smart home device can trigger an action to be performed (by the smart home device or by another device, such as by sending information to the other device to power ON, exit a standby mode, increase a volume of an audio output, etc.).

Embodiments described herein provide several technical advantages over conventional techniques. For example, the presence detection according to the embodiments is more robust than conventional systems because it is derived from different types of sensors that may each be characterized by their own ranges of coverage and presence detection accuracies. A more robust presence detection can result in many improvements to downstream applications. For example, automated presence processing and possibly user identification can be enabled, which can enable better services (e.g., content customization, secure physical access, monitoring system, etc. within a space).

Although embodiments are described herein as including operations implemented by a device, the embodiments are not limited as such. Instead, the embodiments similarly and equivalently cover some or all of the operations being implemented on a device on a different network, a computing cloud, or distributed across such instances. For example, while sensor data is generated by a device, the presence detection data and/or the presence data can be generated by a device on a different network, or a computing cloud.

Storage and/or use of data related to a particular person or device may be controlled by a user using privacy controls associated with a device and/or a companion application associated with the device. Accordingly, users may opt out of storage of data and/or may select particular types of data that may be stored while preventing aggregation and storage of other types of data. Additionally, aggregation, storage, and use of information, as described herein, may be compliant with privacy controls, even if not technically subject to them, to bolster user trust. For example, data described herein may be treated as if it fell under acts and regulations, such as the Health Insurance Portability and Accountability Act (HIPAA) and the General Data Protection Regulation (GDPR), even if it does not actually fall under these acts and regulations.

FIG. 1 illustrates an example of presence detection based on multi modal sensors according to an embodiment of the disclosure. A device 100 is located within a space, such as in a room of a house. The device 100 is shown as having various sensors including a microphone 102, a camera 106, and a radio frequency (RF) transceiver 108. The device 100 also includes a speaker 104, a processor 110, and a memory 112. The memory 112 stores instructions that configure the device 100 to perform various operations upon execution by the processor 110.

In an example, the instructions can cause the microphone 102 to generate first audio data that represents first audio in an audible range of less than 20 KHz (e.g., audio having a frequency of less than 20 KHz). The first audio is detected by the microphone 102 and corresponds to a voice event (e.g., speech by an object 150 in the space, such as a human). The microphone 102 can also generate second audio data that represents second audio in an ultrasound range of more than 20 KHz (e.g., audio having a frequency of more than 20 KHz). The second audio is detected by the microphone 102 in the ultrasound range and can correspond to a motion event and an acoustic event. In particular, the speaker 104 can output ultrasound audio that is reflected from the object 150 in motion in the space. The reflected audio is also in the ultrasound range is detected by the microphone 102. Although the same microphone 102 is illustrated as detecting the audible audio and the ultrasound audio generating the first audio data and the second audio data, the embodiments of the present disclosure are not limited as such. For example, the microphone 102 may be used to detect the audible audio. An ultrasound transceiver can be used to transmit ultrasound audio and detect reflected ultrasound audio to then generate the second audio data. Further, the two types of audio data are described herein for illustrative purposes. Many other types of audio data are possible and can correspond to sensor-triggering events. For example, during daily household activities, several types of sound events are detected by the microphone 102, resulting in corresponding audio data being generated. These sound events include speech, walking or steps, door knocks, appliance uses such as uses of a blender, vacuum etc. Each of these sound events can be an indication of presence. The audio data generated by the microphone 102 from the audio of each of the sound events can have a certain time duration, such as by capturing one second of audio.

In addition, the instructions can cause the camera 106 to generate image data (e.g., computer vision data). The image data can show a portion of the space that is within the field of view of the camera. The image data can be triggered by an event, such as by the object 150 entering the field of view. Computer vision-based sensing can use a combination of camera and image sensing with signal processing and machine learning algorithms. The computer vision algorithms can be trained to generate data indicating presence detection and proximity of an object along with a presence classification using information from the camera.

The instructions can also cause the RF transceiver 108 to transmit a first RF signal and to receive a second RF signal. The second RF signal can correspond to a reflection of the first RF signal within the space (e.g., from an object located in the space). The second RF signal can be processed to generate channel state information (CSI) data. The CSI data can indicate an object presence and can correspond to a motion event. For example, when the space is empty, the CSI data can indicate a set of baseline parametric values. When the space is occupied (e.g., by the object 150 that is moving within the space), the CSI data can indicate a different set of parametric values. The difference between the two sets can indicate the object presence.

In an example, the memory 112 stores program codes for multiple presence detection algorithms 114. Each of these algorithms 114 is executable by the processor 110 to process a particular type of sensor event (or a combination of different sensor event types). For example, each of the multiple presence detection algorithms 114 operates on a type of sensor data (e.g., audio data in the audible range, audio data in the ultrasound range, image data, CSI data) from one of the sensors (or, possible different types of sensor data) to generate presence detection data indicating a prediction of presence detection within the space. That is, a first algorithm of the presence detection algorithms 114 (e.g., a first machine learning algorithm) can generate first presence detection data indicating a first prediction of presence detection from the audio data in the audible range. A second algorithm of the presence detection algorithms 114 (e.g., a second machine learning algorithm) can generate second presence detection data indicating a second prediction of presence detection from the audio data in the ultrasound range. A third algorithm of the presence detection algorithms 114 (e.g., a computer vision algorithm) can generate third presence detection data indicating a third prediction of presence detection from the image data. A fourth algorithm of the presence detection algorithms 114 (e.g., a machine learning algorithm) can generate fourth presence detection data indicating a fourth prediction of presence detection from the image data.

The memory 112 also stores program code for a fusion model 116. The fusion model 116 is executable by the processor 110 to generate presence detection data 103 indicating a final prediction of presence detection within the space based on the outputs of the presence detection algorithms 114. The different presence detection data output by the presence detection algorithms can be input to the fusion model 116 that then outputs the present detection data 103, where the fusion model 116 can fuse the different algorithmic outputs. In an example, the fusion model 116 can include a machine learning model (e.g., a deep neural network). In another example, the fusion model 116 can include a dynamic Bayesian network (DBN) configured to model associations between presence detections, latent variables (e.g., acoustic events, voice events, motion events, etc.), and observed variables (e.g., the outputs of the presence detections algorithms 114) to determine the presence detection data 103 indicating the final prediction of presence detection. Based on the presence detection data 103, the device 100 can determine whether the presence of the object 150 is detected within the space. For instance, the presence detection data 103 may be a binary output representing whether the presence is or is not detected. As another example, the presence detection data 103 may be a likelihood of the presence.

In an example, the memory 112 also stores program code for an action mitigator 118. This program is executable by the processor 110 to cause an action to be performed, where the action is associated with the presence of the object 150 being detected by the device 100. For instance, the action mitigator 118 may cause the speaker 104 to output content based on the presence detection data 103 indicating the presence. Or the action mitigator 118 may cause another device (e.g., a television, a smart light, etc.) to be powered ON or to exit a standby mode based on the presence detection data 103 indicating the presence.

Although FIG. 1 illustrates that the presence detection algorithms 114, the fusion model 116, and the action mitigator 118 are executed locally by the device 100 (e.g., by the processor 110), embodiments of the present disclosure are not limited as such. For example, all of the corresponding program codes can be executed by a remote computing resource communicatively coupled with the device 100 (e.g., a server or a cloud computing service) and/or some of the program codes (e.g., the presence detection algorithms 114) are executed locally by the device 100 while remaining program codes (e.g., the fusion model 116 and the action mitigator 118) are executed remotely by the remote computing resource.

Figure 2:
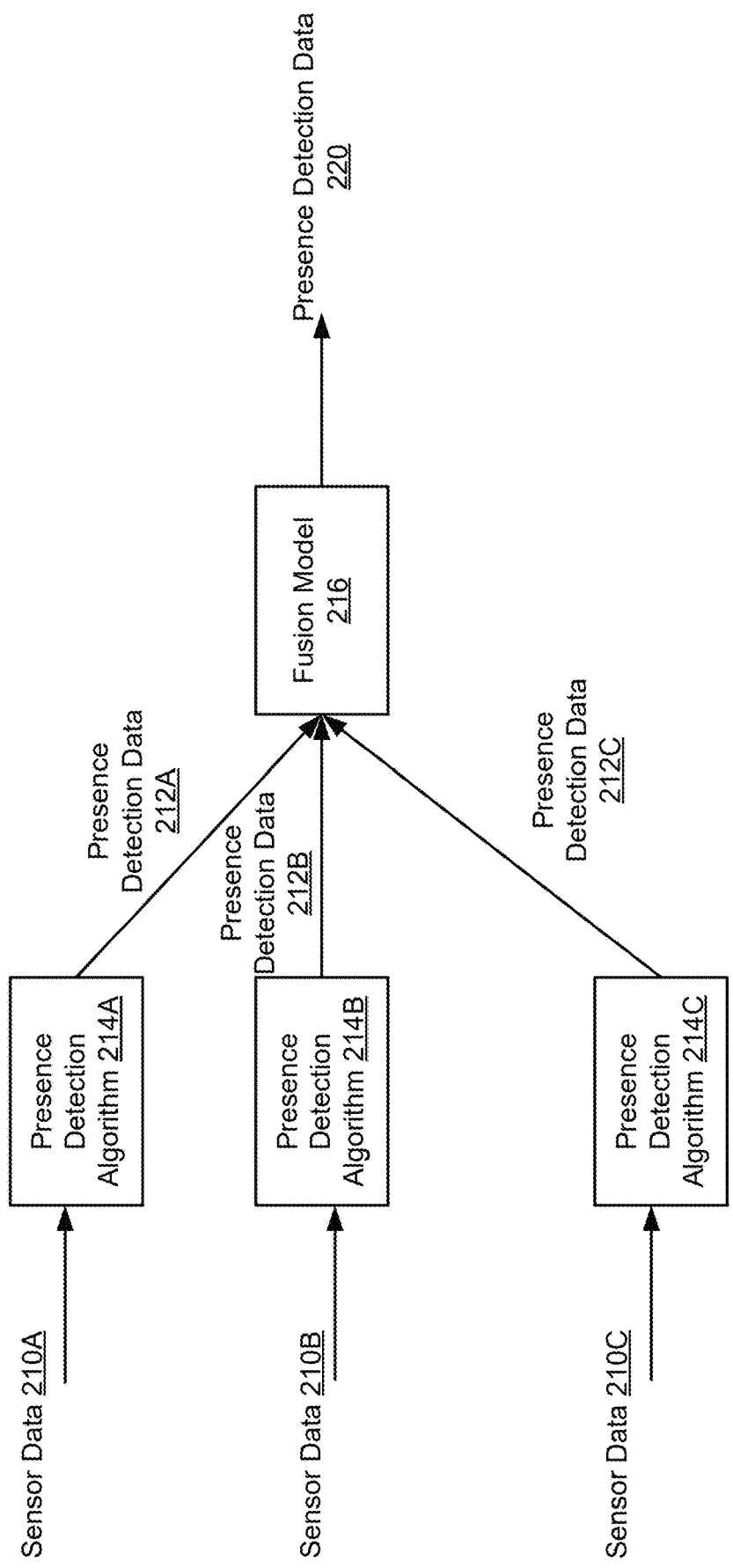
FIG. 2 illustrates an example of presence detection based on a fusion model according to an embodiment of the disclosure.

FIG. 2 illustrates an example of presence detection based on a fusion model 216 according to an embodiment of the disclosure. In general, sensor data 210A-210C, generated by various sensors of a device located within a space (e.g., device 100 in FIG. 1), is input to presence detection algorithms 214A-214C. For instance, the sensor data 210A may include audio data in an audible range generated by a microphone (e.g., microphone 102 in FIG. 1). The sensor data 210A is input to the presence detection algorithm 214A, which generates presence detection data 212A indicating a prediction of an object presence within the space based on the sensor data 210A. The presence detection algorithm 214A is associated with a first set of sensor-triggering events that allow presence detection based on audio data in the audible range. Similarly, the sensor data 210B may include audio data in an ultrasound range generated by the microphone and corresponding to ultrasound audio emitted by a speaker (e.g., speaker 104 in FIG. 1). The sensor data 210B is input to the presence detection algorithm 214B, which generates presence detection data 212B indicating a prediction of an object presence within the space based on the sensor data 210B. The presence detection algorithm 214B is associated a second set of sensor-triggering events that allow presence detection based on audio data in the ultrasound range. In addition, the sensor data 210C may include image data generated by a camera (e.g., camera 106 in FIG. 1). The sensor data 210C is input to the presence detection algorithm 214C, which generates presence detection data 212C indicating a prediction of an object presence within the space based on the sensor data 210C. The presence detection algorithm 214C is associated with a third set of sensor-triggering events that allow presence detection based on image data.

In an example, the fusion model 216 receives the presence prediction data 212A-212C of the presence detection algorithms 214A-214C. The fusion model 216 can generate presence detection data 220 indicating a prediction of an object presence detection based on the presence prediction data 212A-212C of the presence detection algorithms 214A-214C. As an example, the fusion model 216 can be a late fusion model, which refers to a technique of combining different pieces of data about an underlying variable. The underlying variable may not be directly measurable. Instead, a collection of measurements that provide certain attributes of the variable can be used. These attributes can be from the microphone, the speaker, the camera, etc. The combination of the information available may provide a more accurate estimation of true presence compared to the individual predictions for each sensor modality.

In an example, the fusion model 216 may include a graph-based model, such as a graphical probabilistic model. In general, graphical probabilistic models derive their shape from representing probabilities in terms of conditional probabilities, which can be further simplified by using conditional independence relationships. In particular, the fusion model 216 may include a form of probabilistic fusion, where the relationships between a ground truth (e.g., object presence), attributes (e.g., motion, sound, etc. corresponding to different sensor-triggering events), and the sensor data 210A-210C are represented in a graph model in the form of directional acyclic graphs. Generative models are used that compute $p(V|E)$, where V is the variable of interest and E is the evidence given. The estimation of $p(V|E)$ is done using the Bayes rule where the likelihood $p(E|V)$, is combined with the prior probability for the variable $p(V)$ and normalized.

In the case of presence detection, the variable V is the true presence Pr, which is binary-valued (Pr=0/1), given the evidence or the sensor data 210A-210C given by the variables Hs, Us, and CV respectively. The evidence provided for the sensor data 210A-210C are binary-valued (0/1) with their individual confidence. For Bayes rule, the observed sensor values for Hs=0/1, Us=0/1, and CV=0/1 become the evidence E and the true presence Pr becomes the variable of interest V. Note that the likelihood functions $p(Hs|Pr)$, $p(Us|Pr)$, and $p(CV|Pr)$ are equivalent to the performance of the individual sensors like the false accept rate (FAR) and the false reject rate (FRR). In late fusion, the individual sensors can apply any method (e.g., signal processing or a deep neural network) to extract the observations or evidence like Hs,CVHs, CVHs,CV and Us. The final estimation of presence implicitly weighs its decision based on the sensor's individual likelihoods.

Graphical probabilistic models further abstract the Bayes rule to systems with a large number of observed and hidden variables. They derive their shape from representing probabilities in terms of conditional probabilities, for example, the joint probability p(Pr, Us, CV, Hs) can be represented by a graph with a node representing the true presence connected by individual arrows to nodes representing the predictions of presence from each of the sensor data 210A-210C individually. This is under the Naive Bayes assumption that CV, Hs, and Us are independent given Pr. Similarly, inference can be further performed exactly using Bayes' rule:

$$p(Pr = 1 | CV = 1) = \frac{\sum_{Us,Hs} p(Pr = 1, Us, CV = 1, Hs)}{p(CV = 1)}$$

The conditional independence the joint probability to be represented more compactly for example, in the case of binary distributions a representation of $O(2^n)$ given n binary variables can be represented as $O(n2^k)$ where k represents the maximum fan-in of a node.

Figure 3:
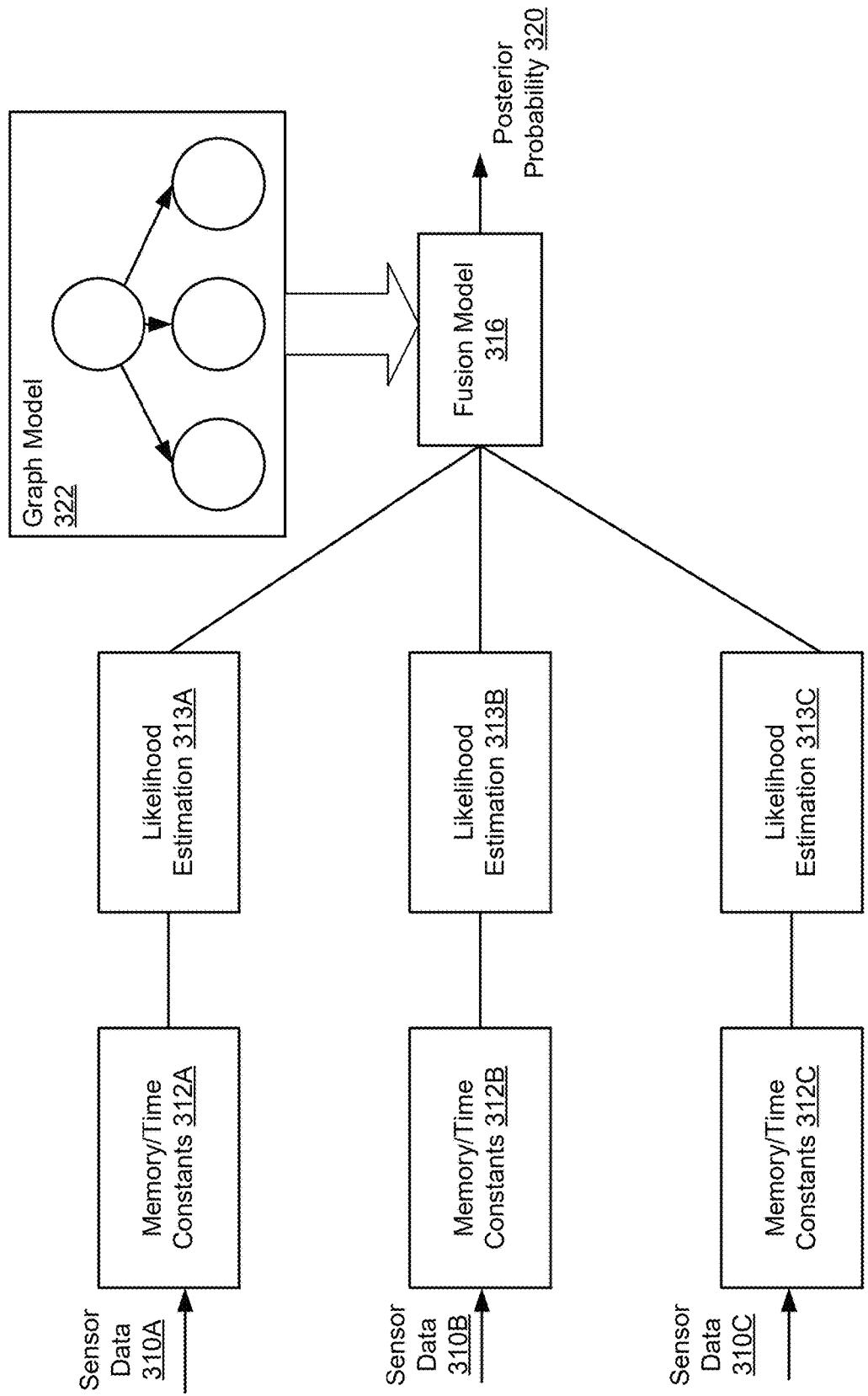
FIG. 3 illustrates an example of using a graph-based model for presence detection according to an embodiment of the disclosure.

FIG. 3 illustrates an example of using a graph-based model for presence detection according to an embodiment of the disclosure. Sensor data 310A-310C is generated by sensors of various modalities of a device (e.g., device 100 in FIG. 1), as described herein above. Likelihood estimations 313A-313C are performed based on the sensor data 310A-310C, respectively, where the likelihood estimations 313A-313C generate likelihood value data indicating predictions of presence detection within a space. The likelihood estimations 313A-313C may also be performed based on memory/time constants 312A-312C. The time constants are time stamps related to previously generated sensor data by each of the sensors that provides memory to the sensor functionality. For example, an audio signal of audio generated by a microphone in an audible range may be sparse as the microphone may only be activated if there is a sound. The audio data may be augmented by increasing the response time constants when audio data in the audible range is detected. The likelihood value data is processed by a fusion model 316 to generate additional data indicating a prediction of presence detection within the space.

In FIG. 3, the fusion model 316 is illustrated as a graph model 322 that represents each of the presence detections, latent variables (e.g., sensor-triggering events), and observed variables (e.g., the likelihood value data given the corresponding sensor data) as a node. Connections between nodes may be represented as conditional probabilities that may be predefined (e.g., through experimentation). In addition, the fusion model 316 can use a transition probability stored in the memory/time constants 312A-312C to determine a posterior probability 320. The transition probability represents a likelihood of transitioning from a previous prediction to the current prediction. So, while executing the fusion model 316 at a first time, the device may retrieve data indicating a previous prediction of presence detection generated at a second time that precedes the first time from the memory/time constants 312A-312C. The data is input to the fusion model 316, which uses the transition probability between the previous presence detection at the second time and the presence detection at the first time to determine the posterior probability 320. The posterior probability 320 corresponds to data indicating a prediction of presence detection within the space.

Figure 4:
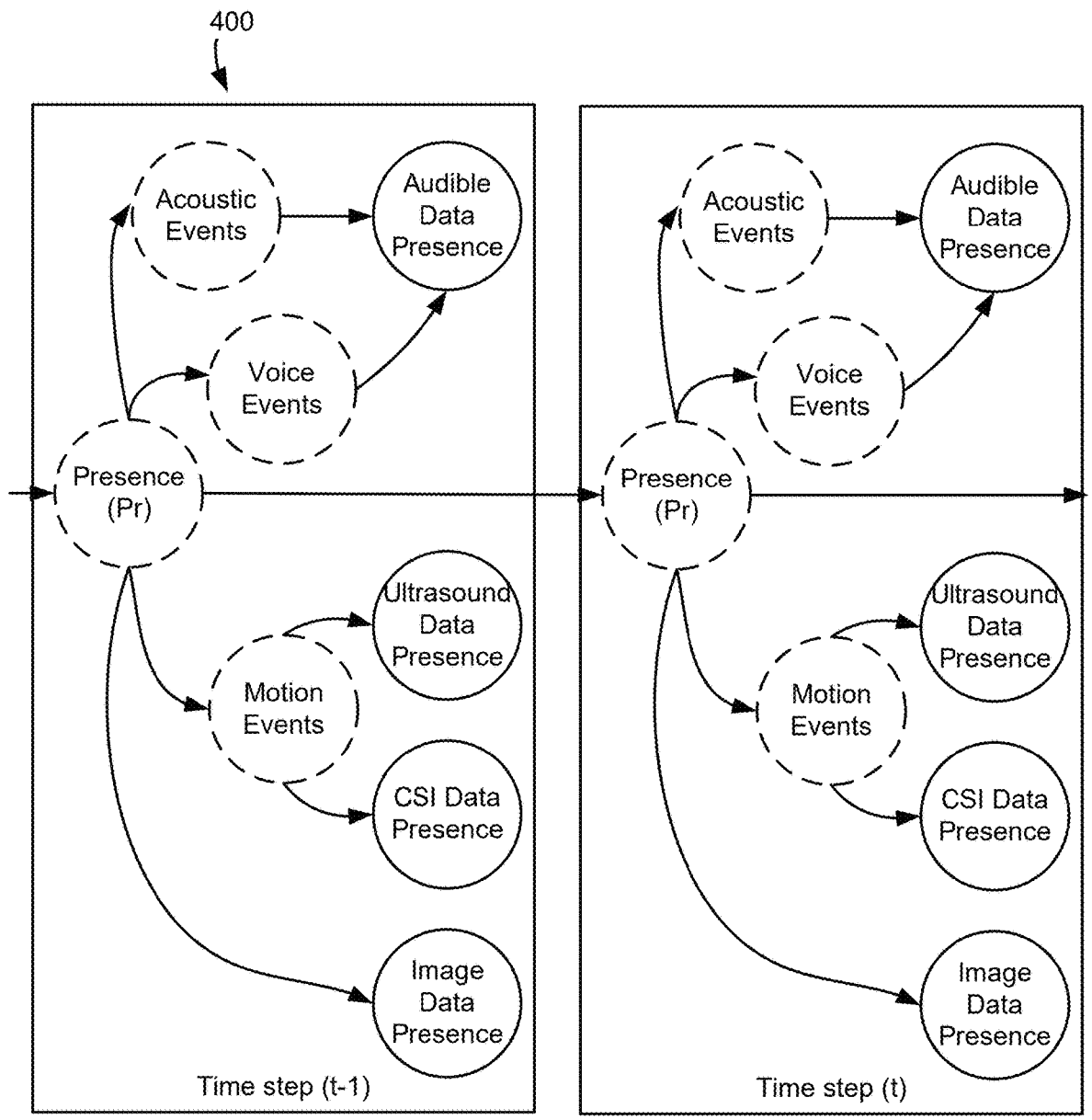
FIG. 4 illustrates an example of a dynamic Bayesian network for presence detection according to an embodiment of the disclosure.

FIG. 4 illustrates an example of a DBN 400 for presence detection according to an embodiment of the disclosure. The DBN 400 is an example of the graph model 322 in FIG. 3. DBNs are an extension of graphical probabilistic models to represent sequential or temporal data. DBNs can be seen as a superset of algorithms like Kalman filter, Hidden Markov Models (HMM) and particle filters. In the embodiments described herein, the DBN 400 can be used to fuse unreliable evidence from different sensor modalities, incorporating any prior knowledge about latent variables, and fusing the evidence temporally to track variables of interest.

The DBN 400 represents presence detections (Pr), latent variables (indicated by dashed lines), and observed variables (indicated by solid lines) as nodes. In addition, connections between nodes are represented as conditional probabilities having a value stored in a memory. So, for a node connection between a latent variable and an observed variable, the node connection represents predetermined data about the latent variable and the observed variable. In addition, for a node connection between a presence detection and a latent variable, the node connection represents predetermined data about the presence detection and the latent variable.

The DBN 400 in FIG. 4 includes latent variables of acoustic events (e.g., appliance sounds, knocking, footsteps, etc.), voice events, and motion events (e.g., walking, reading, typing, etc.). Other exemplary latent variables include range representing a distance of the presence from the device and an azimuth representing an orientation of the presence with respect to the device. The DBN 400 also includes observed variables of audible data presence (e.g., that audio data having a frequency of less than 20 KHz (or more broadly sensor data of a first type) is generated and processed by a presence detection algorithm, where the output of the processing indicates whether an object is present), ultrasound data presence (e.g., that audio data having a frequency of more than 20 KHz (or more broadly sensor data of a second type) is generated and processed by a presence detection algorithm, where the output of the processing indicates whether an object is present), CSI data presence (e.g., CSI data (or more broadly sensor data of a third type) is generated and processed by a presence detection algorithm, where the output of the processing indicates whether an object is present), and image data presence (e.g., image data (or more broadly sensor data of a second type) is generated and processed by a presence detection algorithm, where the output of the processing indicates whether an object is present). Another exemplary observed variable includes a measure of an ambient light level in a space (e.g., where the measure can indicate a presence of an object). The audible data presence, ultrasound data presence, CSI data presence, and image data presence are each determined by inputting data from a particular sensor (e.g., microphone, RF antenna, camera, etc.) into a corresponding presence detection algorithm. So, the audible data presence, ultrasound data presence, CSI data presence, and image data presence correspond to data usable for detecting an object presence.

In an example, the audible data presence is associated with the latent variables for acoustic events and voice events. So, the DBN 400 can associate an acoustic event and a voice event with presence being detected based on audio data in the audible range. In addition, the ultrasound data presence and the CSI data presence are associated with the latent variable for motion events. So, the DBN 400 can associate a motion event with presence being detected based on audio data in an ultrasound range and/or based on CSI data generated based on a RF transmission.

Presence detection predictions using the DBN 400 are shown at two times, time (t) and time (t−1). At each time, the DBN 400 generates data indicating a prediction of presence detection within a space as a function of conditional probabilities. For instance, the DBN 400 can generate the data based on a conditional probability of an acoustic event given the audible data presence, a conditional probability of a voice event given the audible data presence, a conditional probability of a presence given the acoustic event, and a conditional probability of presence given the voice event. In addition, the DBN 400 can generate the data based on a conditional probability of a motion event given the ultrasound data presence and a conditional probability of presence given the motion event. Furthermore, the DBN 400 can generate the data based on a conditional probability of the motion event given the CSI data presence. The data may additionally be generated based on a conditional probability of presence given the image data presence. The data can correspond to a node of the DBN 400.

In an example, at time step (t), the data indicating the prediction of presence detection within the space can be generated by using the data indicating the prediction of presence detection from time step (t−1) as an input to the DBN 400. The data from time step (t−1) can be stored in and retrieved from a memory. The DBN 400 generates the data based on a transition probability between the prediction at time step (t−1) and the prediction at time step (t).

In an example, training of the DBN 400 to define the conditional probabilities can involve iteratively setting the conditional probabilities until there is a good fit between the observed variables and the latent variables and the presence detection. During training, the latent variables are known. For instance, if an ultrasound sensor indicates a presence detection during training, it is known whether or not there was motion. A frequentist probability estimation approach can be used to estimate the conditional probabilities using the ground truths. To do so, the different events can be counted and normalized to form the conditional probabilities. For example, the probability p(CV|Pr) where the image data (CV) observation is conditioned on true presence can be estimated as follows:

$$p(CV = 1 \mid r = 1) = \frac{N(CV = 1, Pr = 1)}{N(Pr = 1)}$$

Similarly, the transition probabilities for each of variables with memory can be estimated by taking the ratio of the state transitions from one time stamp to another. Controlling this parameter can enable the estimation of the overhang time between presence and vacancy depending on which sensors triggered in the past.

Learning in graph models can be divided into two broad categories, parameter learning and structure learning. Assuming the graph or model is already defined, the next step is to estimate the parameters of the nodes in the form of either continuous distributions or discrete conditional probability tables. If the data provided (including the ground truth data) allows full observability of all parameters in the graph, then the parameters can be extracted by optimization techniques like maximum likelihood. Alternatively, if the data available does not provide full observability on some of the hidden nodes, then techniques like expectation maximization (EM) or deep neural networks can be used to represent the nodes.

Note that there is a distinction between inference and learning. Inference implies learning the pdf functions like p(Xh|Xo, θ), where θ is the parameters defining the individual probabilities in the DBN. Learning on the other hand implies learning the parameters θ of the pdf. A maximum a posteriori estimate of the parameters given data can be computed by:

$$\hat{\theta} = \mathrm{argmax}_\theta \Sigma_{i=1}^N \log p(x_{i,v} \mid \theta) + \log p(\theta)$$

In the case of discrete nodes, machine learning equations can involve estimating the discrete conditional probability tables as ratios of event frequencies. In the case of continuous variables, the network can be learned as a Kernel based network and traditional mean squared error learning can be used including back propagation.

Structure learning on the other hand is a way to estimate the underlying model itself given the observations and the variables in the graph. This includes connections between the nodes. Learning on graphs can use a search and score algorithm, where the scoring is done using marginal likelihood or penalized likelihood and the searching is done using algorithms like bottom up, top down etc.

In an example, to learn a graph from data, the network can learn by creating a family of graphs F with an associated set of node types N. The different initial graphs are transformed to Partially observed Markov decision process (POMDP). An agent takes different combinations of routes within the sub-graphs and the observed probabilities are compared to the ground truth observations. The graph edges are set based on the errors. Simultaneously, the node values are estimated like the parameter training problem and repeated until a certain value is converged on.

Graph neural networks also provide methods to learn from data. For example, graph neural networks include message passing neural networks (MPNN) that compute sums of messages sent across each edge and transformer like models operating at the graph nodes like the Graph Relational Embedding Attention Transformer (GREAT).

As another example, for a graph-based model (e.g., graph model 322 in FIG. 3), a trained neural network may be used to define the conditional probabilities. The predictions of presence detection, sensor data, the definition of the variables, etc. is input into the neural network, which outputs the values for the conditional probabilities.

Figure 5:
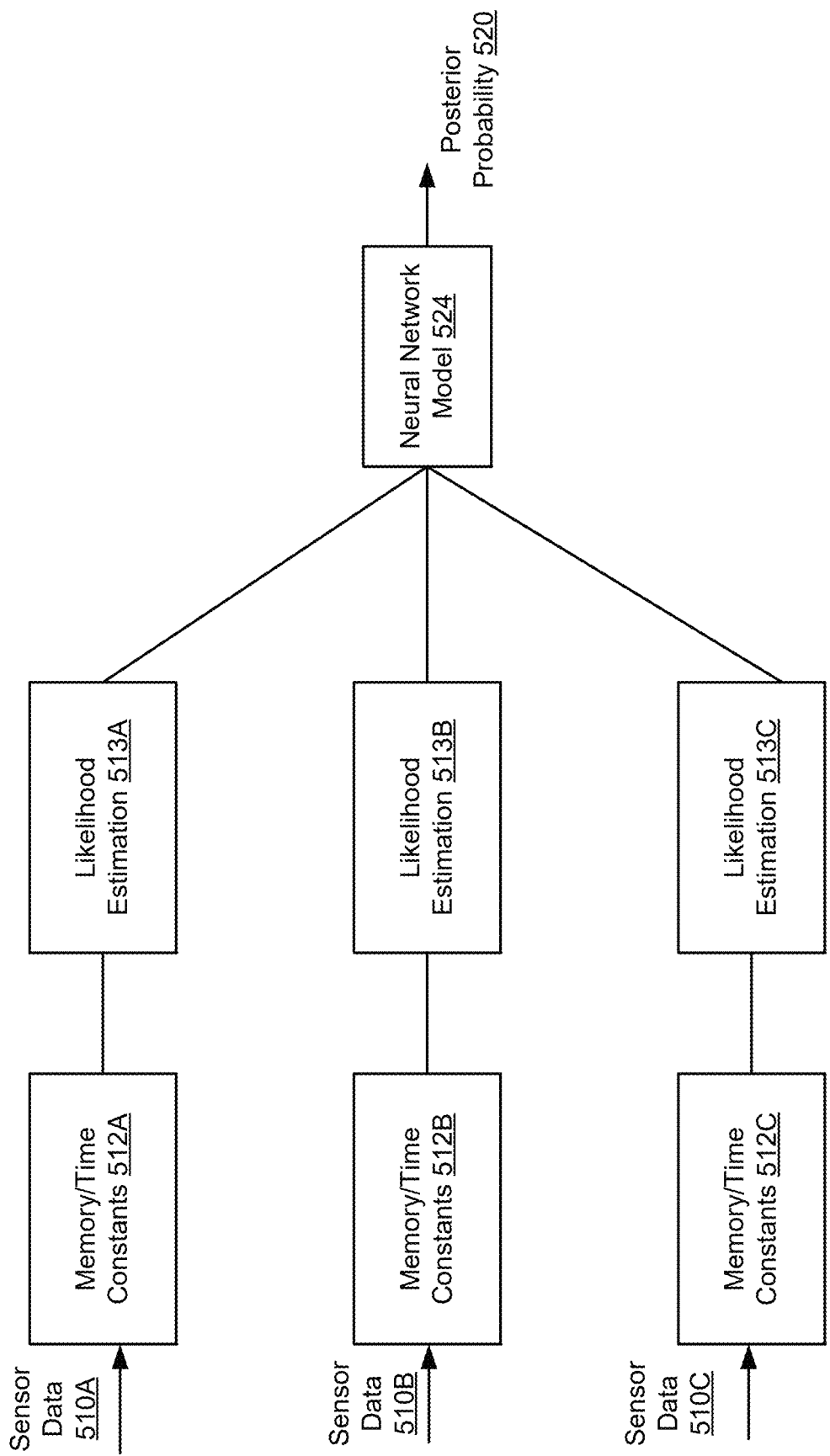
FIG. 5 illustrates an example of using a neural network model for presence detection according to an embodiment of the disclosure.

FIG. 5 illustrates an example of using a neural network model for presence detection according to an embodiment of the disclosure. Sensor data 510A-510C is generated by sensors of various modalities of a device (e.g., device 100 in FIG. 1), as described herein above. Likelihood estimations 513A-513C are performed based on the sensor data 510A-510C, respectively, where the likelihood estimations 513A-513C generate likelihood value data indicating predictions of presence detection within a space. The likelihood estimations 513A-513C may also be performed based on memory/time constants 512A-512C. The time constants are time stamps related to previously generated sensor data by each of the sensors that provides memory to the sensor functionality. The likelihood value data is processed by a neural network model 524 to generate additional data (e.g., a posterior probability 520) indicating a prediction of presence detection within the space.

In an example, a fusion model (e.g., fusion model 116 in FIG. 1) may include the neural network model 524. The neural network model 524 can be trained using known values of latent variables (e.g., acoustic events, motion events, etc.), observed variables (e.g., the likelihood value data), and presence detections (e.g., the posterior probability 520). For online training, a training data set can include the data indicating predictions of presence detections based on the sensor data 510A-510C and the posterior probability 520. Associations of the fusion model can be updated based on the training data set by setting the posterior probability 520 as a ground truth corresponding to the predictions of presence detections based on the sensor data 510A-510C in the training data set.

Figure 6:
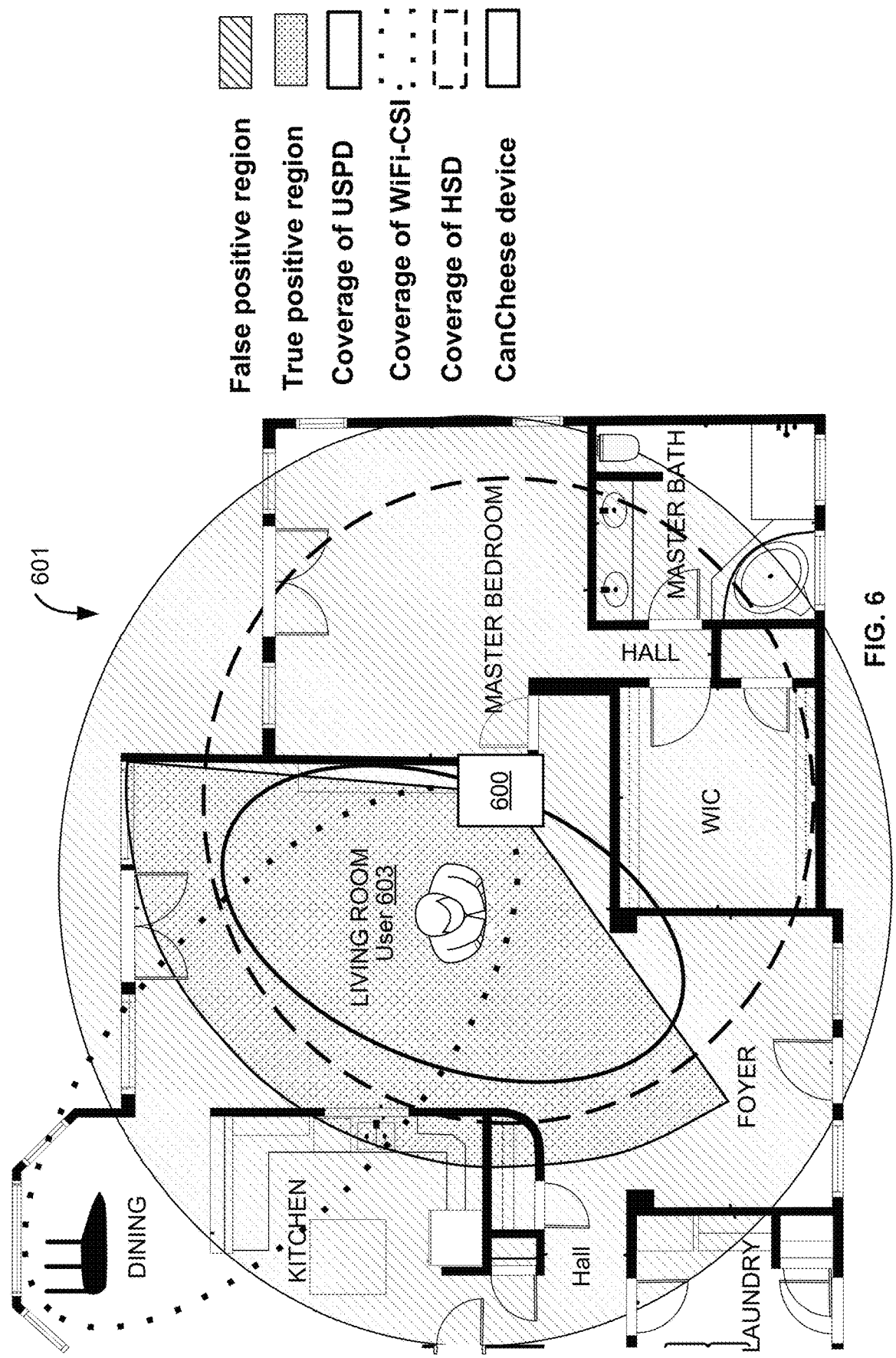
FIG. 6 illustrates an example of presence detection of a user in a space according to an embodiment of the disclosure.

FIG. 6 illustrates an example of presence detection of a user 603 in a space 601 according to an embodiment of the disclosure. A device 600, which is an example of the device 100 in FIG. 1, has sensors including a microphone that generates audio data representing audio in an audible range and audio in an ultrasound range corresponding to ultrasound audio emitted by a speaker. In addition, the device 600 includes an RF transceiver for transmitting and receiving RF signals and generating CSI data. A range of coverage of each of the sensors of the device 600 is shown. For instance, the range of coverage of the microphone for detecting audio in the audible range is shown by the dashed circle. The range of coverage of the microphone in the ultrasound range is shown by the smaller, solid oval. The range of coverage of the RF antenna is shown by the longer, solid oval.

In an example, the user 603 is within the range of coverage of all of the sensors. So, presence detection algorithms that generate data indicating a prediction of presence detection for each sensor may each generate data indicating the presence of the user 603. In addition, a fusion model that generates final data indicating a prediction of presence detection based on the predictions from the presence detection algorithms as a function of conditional probabilities, may generate data indicating a strong likelihood of presence.

Figure 7:
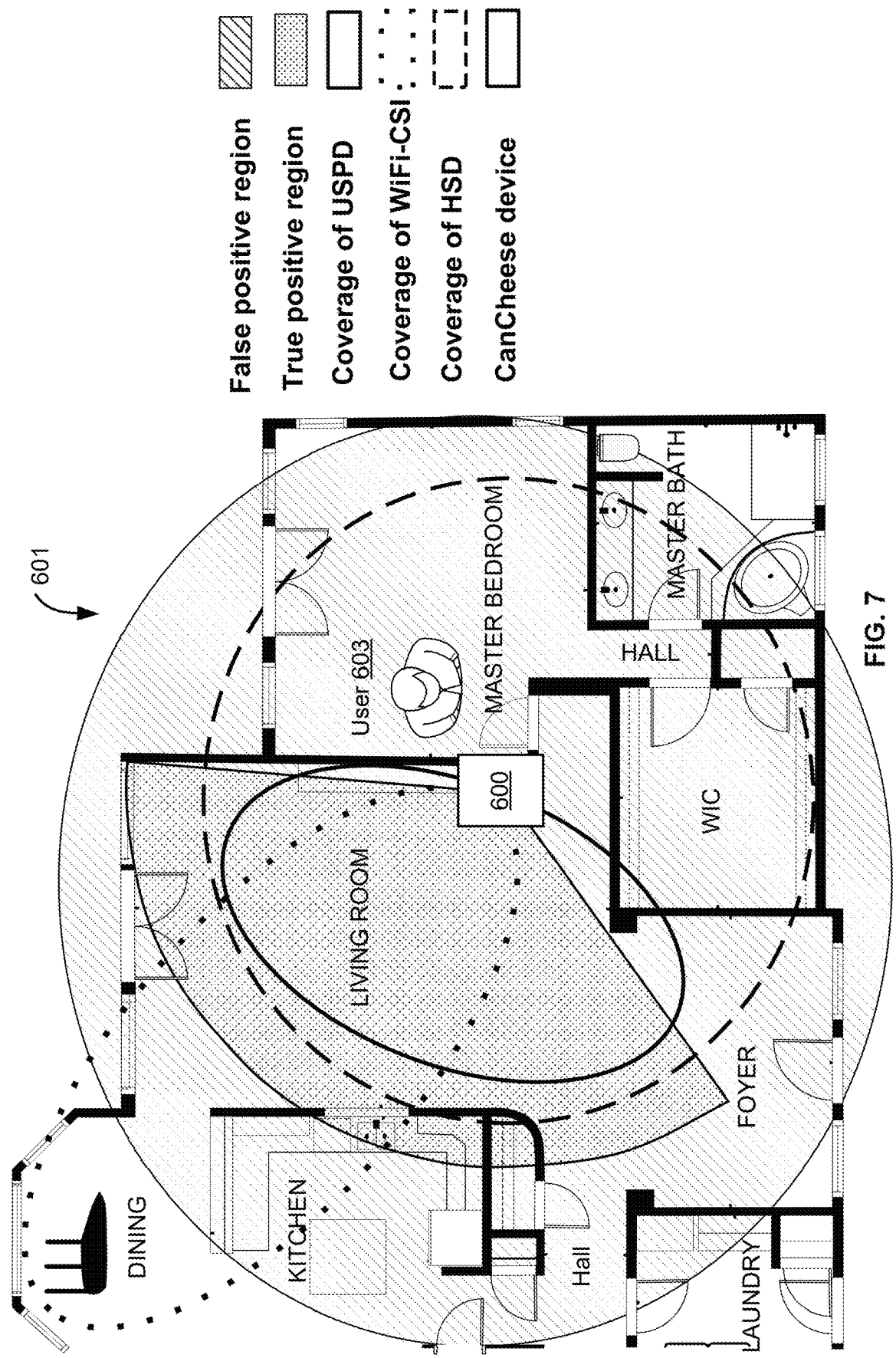
FIG. 7 illustrates another example of presence detection of a user in a space according to an embodiment of the disclosure.

In contrast, the user 603 in FIG. 7, which illustrates another example of presence detection of the user 603 in the space 601 according to an embodiment of the disclosure, is located behind a device 600, where only the microphone is able to detect audio in the audible range. In this case, only the presence detection algorithm that generates data indicating a prediction of presence detection for the microphone in the audible range may generate data indicating the presence of the user 603. Other presence detection algorithms for other sensors may generate data indicating there is no presence detected. The fusion model may still generate final data indicating a likelihood of presence. Other techniques, such as averaging predictions of the presence detection algorithms and comparing the average prediction to a threshold may not reliably detect the user 603.

In an example, online training of the fusion model may involve generating a training data set when a most accurate sensor determines presence. So, if the sensor data is from a sensor of a type that is most accurate (e.g., the sensor being a camera), or a prediction of presence is from a particular presence detection algorithm (e.g., a computer vision algorithm), online training may be performed. For instance, and referring back to FIGS. 6 and 7, assume that the use of CSI data for the purpose of presence detection is the most accurate relative to using ultrasound audio data and audible audio data. In other words, the RF transceiver generating the CSI data is the most accurate sensor of the device 600. In this illustrative example, then the CSI data, the audio data, and the outputs of the presence detection algorithms may only be used in a training data set for the case of FIG. 6 (e.g., when the user 603 is in the CSI detection range the CSI data indicates the user's 603 presence) and not the case of FIG. 7, since the user's 603 presence is not detected from the CSI data in FIG. 7.

In another example, the output of each presence detection algorithm indicates a probability of an object presence being detected. The output having the largest probability can be used as the ground truth, when the highest probability exceeds a threshold. Referring to the example of FIG. 7, the processing of the ultrasound audio data indicates that the user 603 is present with a first probability, whereas the processing of the CSI data and audible audio data indicates that the user 603 is not present with other probabilities. Assuming that the first probability is the largest among the three probabilities and exceeds a threshold, the presence of the user 603 can be set as the ground truth and used to further train the fusion model.

Generally, the training (including the online training) allows to update parameters of the fusion model (e.g., the conditional probabilities in the case of a graph-based model or the weight of node connections in the case of a deep neural network). The online training enables the fusion model (and, by extent, the device) to learn about the space such that more accurate presence detections can be generated when the user 603 is in an area of the space covered by a only subset of the sensors.

Figure 8:
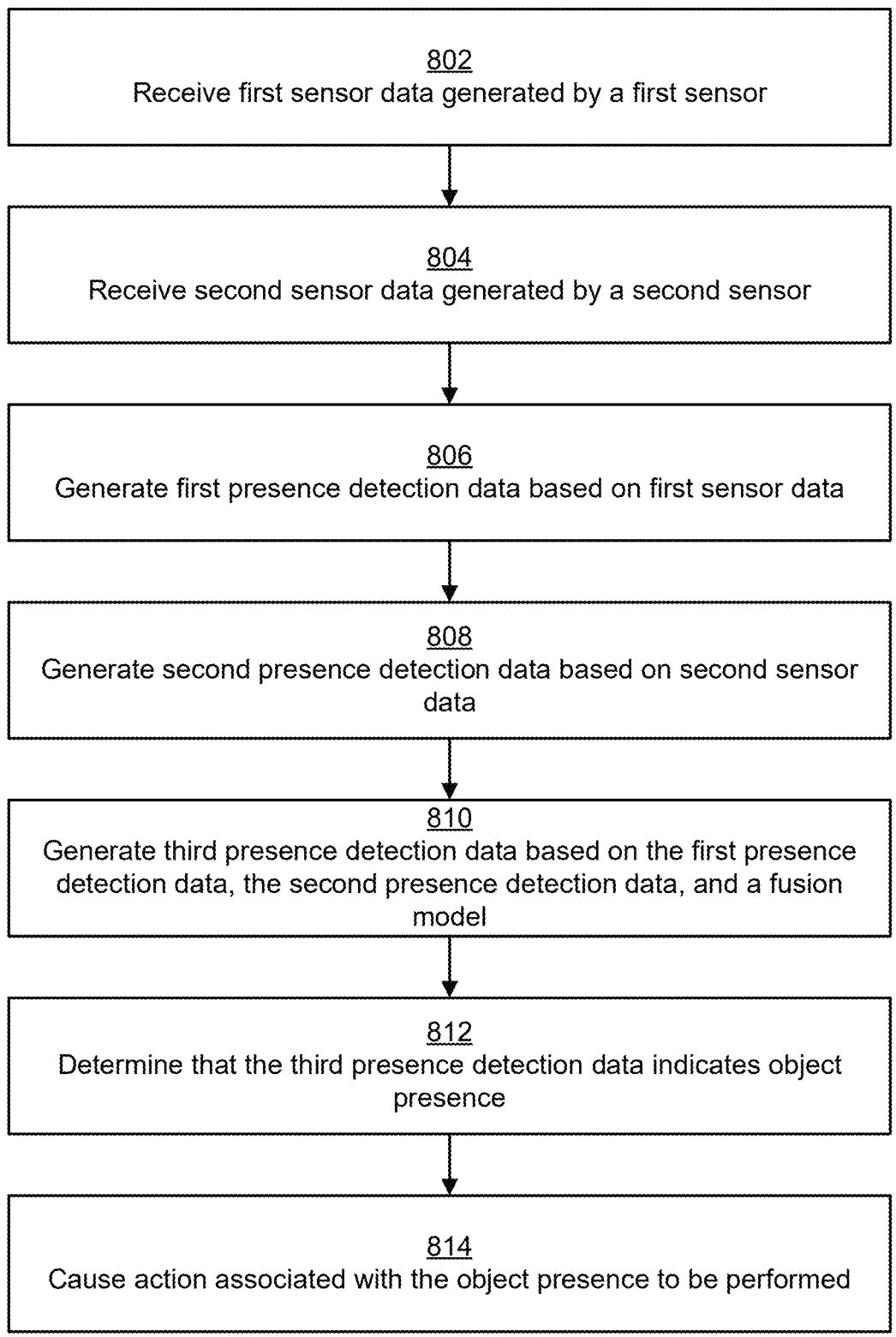
FIG. 8 illustrates an example flow for a process of presence detection based on multi modal sensors according to an embodiment of the disclosure.
Figure 9:
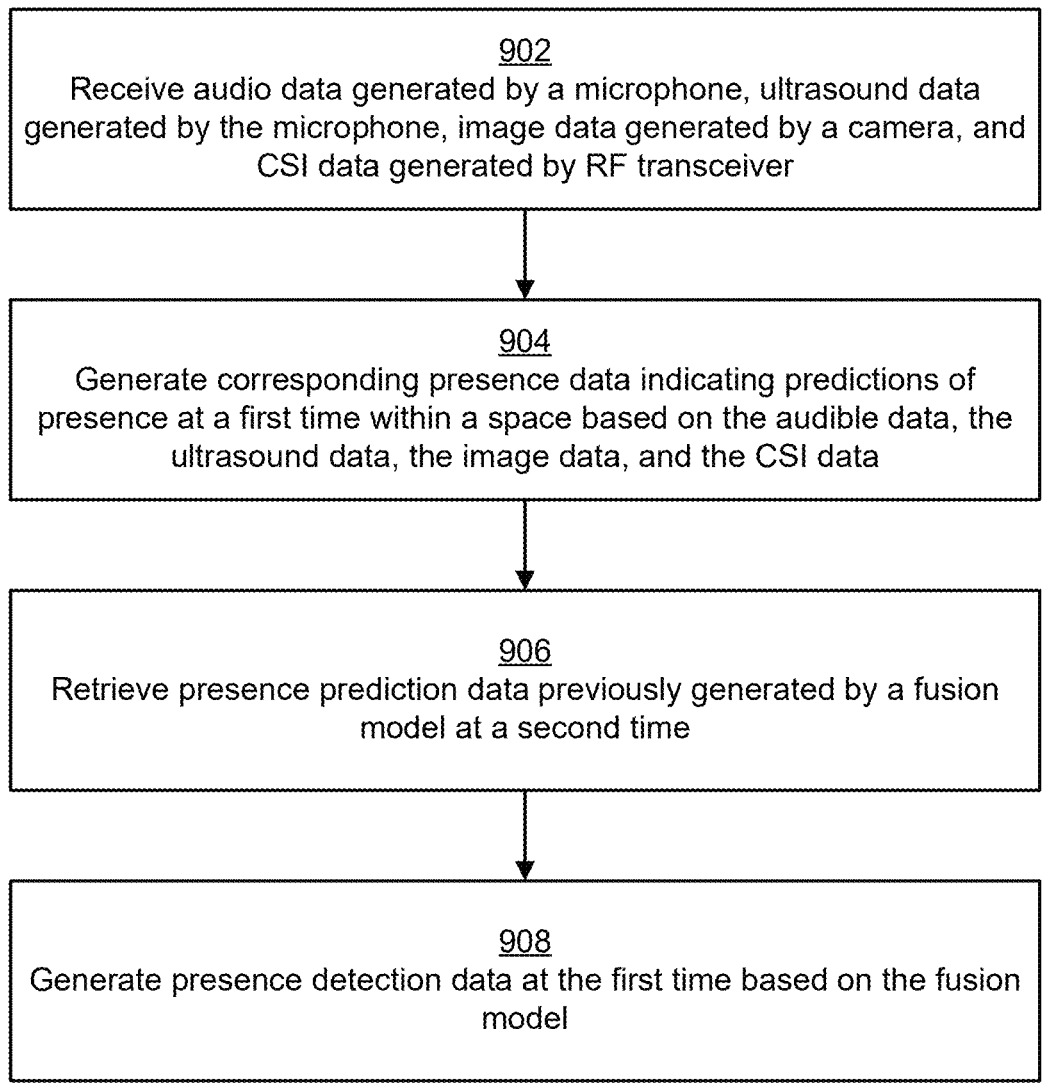
FIG. 9 illustrates an example flow for a process of presence detection from audio data and image data according to an embodiment of the disclosure.

FIGS. 8 and 9 illustrate example flows for processes related to multi device-based presence processing according to an embodiment of the disclosure. In some embodiments, the processes may be performed by a computer system described herein (e.g., device 100 in FIG. 1). The processes (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Some or all of the processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 8 illustrates an example flow for a process of presence detection based on multi modal sensors according to an embodiment of the disclosure. In an example, the flow includes operation 802, where the computer system receives first sensor data generated by a first sensor. For example, the first sensor data includes first audio data generated by a microphone. The first audio data represents first audio in an audible range of less than twenty KHz.

In an example, the flow includes operation 804, where the computer system receives second sensor data generated by a second sensor. For example, the second sensor data includes audio data generated by the microphone. The second audio data represents second audio in an ultrasound range of more than twenty KHz. The second audio data corresponds to ultrasound audio emitted by a speaker. Additionally, or alternatively, the second sensor data includes image data generated by a camera and/or CSI data generated based on RF signals transmitted and received by an RF transceiver.

In an example, the flow includes operation 806, where the computer system generates first presence detection data based on the first sensor data. This data can indicate a first prediction of an object presence within a space. The first data presence detection data can be generated from the first sensor data independently of the second sensor data. For example, the first presence detection data is generated by using the first sensor data as an input to a first presence detection algorithm (e.g., a first machine learning model). The output of the first presence detection algorithm can include the first presence detection data.

In an example, the flow includes operation 808, where the computer system generates second presence detection data based on the second sensor data. The second presence detection data can be generated from the second sensor data independently of the first sensor data. For example, the second presence detection data is generated by using the second sensor data as an input to a second presence detection algorithm (e.g., a second machine learning model). The output of the second presence detection algorithm can include the second presence detection data.

In an example, the flow includes operation 810, where the computer system generates third presence detection data based on the first presence detection data, the second presence detection data, and a fusion model. The fusion model includes a deep learning model or a graph model (e.g., a DBN) and is configured to generate the third presence detection data by modeling associations between presence detections, latent variables, and observed variables. The observed variables correspond to the first prediction and the second prediction, and the latent variables correspond to sensor-triggering events. For instance, the latent variables can correspond to an acoustic event, a voice event, and a motion event.

In an example, the flow includes operation 812, where the computer system determines that the third presence detection data indicates that the object presence is detected within the space. The third presence detection data may include a binary value indicating whether or not the object presence is detected, or a likelihood of the object presence being detected.

In an example, the flow includes operation 814, where the computer system causes an action associated with the object presence to be performed. For instance, the computer system can send information about the action to a device (e.g., a smart television), where the device executes the action based on the information (e.g., exit a standby mode, output particular type of content based on the presence, etc.).

FIG. 9 illustrates an example flow for a process of presence detection from audio data and image data according to an embodiment of the disclosure. In an example, the flow includes operation 902, where the computer system receives audio data generated by a microphone, ultrasound data generated by the microphone, image data generated by a camera, and CSI data generated by an RF transceiver. The audio data can be in an audible range and can correspond to a voice event that triggers the microphone to generate the audio data. The ultrasound data corresponds to ultrasound audio emitted by a speaker and can correspond to an acoustic event and/or a motion event that triggers the microphone to generate the ultrasound audio. The image data can correspond to a field of view event (e.g., an object entering, moving, or being with the field of view of the camera). The CSI data can correspond to a motion event.

In an example, the flow includes operation 904, where the computer system generates corresponding presence detection data indicating predictions of presence at a first time within a space that includes the computer system based on the audible data, the ultrasound data, the image data, and the CSI data. A first presence detection algorithm can generate first presence detection data indicating a first prediction of presence based on the audible data. A second presence detection algorithm can generate second presence detection data indicating a second prediction of presence based on the ultrasound data. A third presence detection algorithm can generate third presence detection data indicating a third prediction of presence based on the image data. A fourth presence detection algorithm can generate fourth presence detection data indicating a fourth prediction of presence based on the CSI data. The first, second, third, and fourth presence prediction can be used as an input to a fusion model, where the input is associated with the first time. The fusion model is configured to model associations between presence detections, latent variables, and observed variables. The observed variables correspond to the predictions that are output by the presence detection algorithms, and the latent variables correspond to sensor-triggering events. The sensor-triggering events can include the voice event, the acoustic event, and the motion event.

In an example, the flow includes operation 906, where the computer system retrieves presence prediction data previously generated by the fusion model at a second time. This data may have been generated at the second time by using a different set of presence detection data as a previous input at the second time to the fusion model, where this set corresponds to the outputs of the presence detection algorithms at the second time.

In an example, the flow includes operation 908, where the computer system generates, at the first time, presence detection data indicating prediction of presence within the space. Here, the input generated at the first time (e.g., the outputs of the presence detection algorithms per operation 904) and the previous output at the second time of the fusion model (e.g., its presence detection data at the second time) are provided to the fusion model. The corresponding output of the fusion model is associated with the first time and indicates the prediction as a fused prediction. The fusion model is configured to use a transition probability between is previous output at the second time and its current output at the first time.

Figure 10:
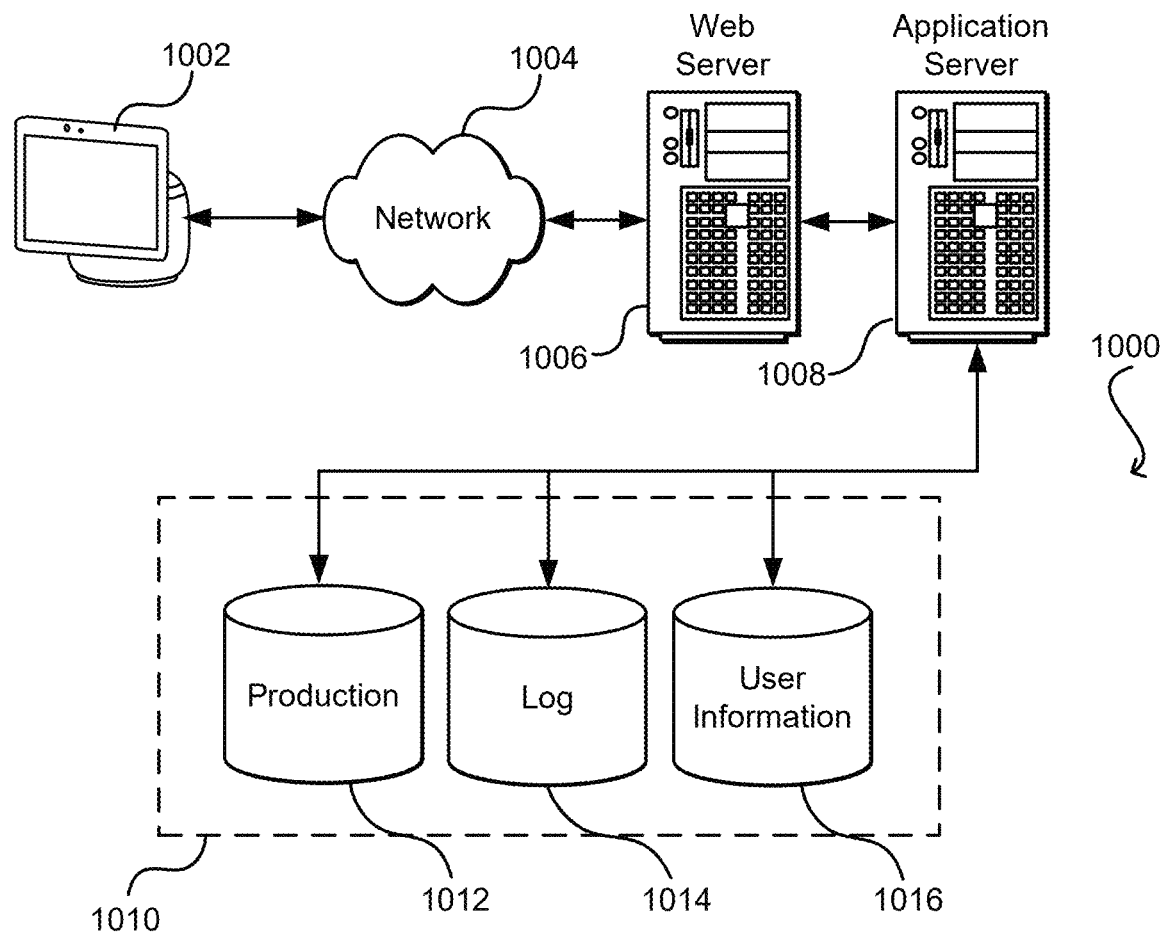
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A device comprising:
a microphone;
a speaker;
one or more processors; and one or more memories storing instructions that, upon execution by the one or more processors, configure the device to:
- receive first audio data generated by the microphone, the first audio data representing first audio having a first frequency of less than 20 KHz;
- receive, second audio data generated by the microphone, the second audio data representing second audio having a second frequency of more than 20 KHz, the second audio being emitted by the speaker;
- generate, by at least using the first audio data and a first presence detection algorithm, first presence detection data indicating that a voice event is detected within a space;
- generate, by at least using the second audio data and a second presence detection algorithm, second presence detection data indicating that a motion event is detected within the space;
- generate third presence detection data by at least using the first presence detection data, the second presence detection data, and a fusion model, the fusion model configured to generate the third presence detection data by at least using latent variables and observed variables, the observed variables corresponding to the first presence detection data and the second presence detection data, the latent variables corresponding to sensor-triggering events that include the voice event and the motion event;
- determine that the third presence detection data indicates that an object is present within the space; and
- cause an action associated with the object to be performed.

2. The device of claim 1, wherein the fusion model comprises a dynamic Bayesian network (DBN) that represents each one of the latent variables and the observed variables as a corresponding node and that represents a connection between two nodes as a conditional probability, and wherein the third presence detection data corresponds to a node of the DBN and is generated as a function of conditional probabilities.

3. The device of claim 1, wherein the third presence detection data is generated at a first time, and wherein the one or more memories store further instructions that, upon execution by the one or more processors, configure the device to:
- generate, by at least using the fusion model at a second time that precedes the first time, fourth presence detection data indicating that the object is present within the space, wherein the third presence detection data is generated by at least using the fourth presence detection data as an input to the fusion model, and wherein the fusion model is configured to use a transition probability between presence being detected at the second time and the presence being detected at the first time.

4. A computer-implemented method comprising:
- determining, using first sensor data, first presence detection data indicating whether an object is present within a space, the first sensor data generated based at least in part on a first sensor-triggering event;
- determining, using second sensor data, second presence detection data indicating whether the object is present within the space, the second sensor data being of a different type than the first sensor data and generated based at least in part on a second sensor-triggering event; and
- generating, based at least in part on the first presence detection data, the second presence detection data, and a fusion model, third presence detection data indicating whether the object is present within the space, the fusion model configured to generate the third presence detection data by using latent variables and observed variables, the observed variables corresponding to the first presence detection data and the second presence detection data, the latent variables corresponding to the first sensor-triggering event and the second sensor-triggering event.

5. The computer-implemented method of claim 4, further comprising:
- determining, based at least in part on the first presence detection data, that the object is within the space, wherein the first sensor data comprises audio data having a frequency of less than 20 KHz; and
- determining, based at least in part on the third presence detection data, that the object is within the space, wherein the first sensor-triggering event comprises at least one of: an acoustic event or a voice event, and wherein a first latent variable corresponds to the acoustic event and a second latent variable corresponds to the voice event, wherein the fusion model associates the acoustic event and the voice event with a presence detection of the object.

6. The computer-implemented method of claim 5, further comprising:
- determining a first probability of the acoustic event given the first sensor data, a second probability of the voice event given the first sensor data, a third probability of the object being in the space given the acoustic event, and a fourth probability of the object being in the space given the voice event, wherein the third presence detection data is generated by the fusion model based at least in part on the first probability, the second probability, the third probability, and the fourth probability.

7. The computer-implemented method of claim 4, further comprising:
- determining, based at least in part on the first presence detection data, that the object is present within the space, wherein the first sensor data comprises audio data having a frequency of more than 20 KHz; and
- determining, based at least in part on the third presence detection data, that the object is present within the space, wherein the first sensor-triggering event comprises a motion event, wherein a latent variable corresponds to the motion event, wherein the fusion model associates the motion event with a presence detection of the object.

8. The computer-implemented method of claim 7, further comprising:
- determining a first probability of the motion event given the first sensor data and a second conditional probability of the object being in the space given the motion event, wherein the third presence detection data is generated by the fusion model based at least in part on the first probability and the second conditional probability.

9. The computer-implemented method of claim 7, further comprising:
- generating channel state information (CSI) data, wherein the second sensor data includes the CSI data;
- generating the second presence detection data based at least in part on the CSI data and a presence detection algorithm; and determining, based at least in part on the second presence detection data, that the object is present within the space, wherein the third presence detection data is generated by the fusion model based at least in part on a third probability of the motion event given the second sensor data.

10. The computer-implemented method of claim 4, further comprising:
determining, based at least in part on the first presence detection data, that the object is present within the space, wherein the first sensor data comprises image data; and
determining, based at least in part on the third presence detection data, that the object is present within the space, wherein the third presence detection data is generated by the fusion model based at least in part on a probability of an object presence given the first sensor data.

11. The computer-implemented method of claim 4, wherein the third presence detection data is generated at a first time, and further comprising:
generating, at a second time prior to the first time, fourth presence detection data indicating whether the object is present within the space, wherein the fusion model is configured to generate the fourth presence detection data based at least in part on a probability of the object being present at the first time given whether the object was present at the second time.

12. A system comprising:
one or more processors; and
one or more memories storing instructions that, upon execution by the one or more processors, configure the system to:
determine, using first sensor data, first presence detection data indicating whether an object is present within a space, the first sensor data generated based at least in part on a first sensor-triggering event;
determine, using second sensor data, second presence detection data indicating whether the object is present within the space, the second sensor data being of a different type than the first sensor data and generated based at least in part on a second sensor-triggering event; and
generate, based at least in part on the first presence detection data, the second presence detection data, and a fusion model, third presence detection data indicating whether the object is present within the space, the fusion model configured to generate the third presence detection data by using latent variables and observed variables, the observed variables corresponding to the first presence detection data and the second presence detection data, the latent variables corresponding to first sensor-triggering event and the second sensor-triggering event.

13. The system of claim 12, wherein the first sensor data comprises one of first audio data having a first frequency of less than 20 KHz, second audio data having a second frequency of more than 20 KHz, channel state information (CSI) data, or image data, wherein the second sensor data comprises another one of the first audio data, the second audio data, the CSI data, or the image data, and wherein the latent variables represent a motion event, an acoustic event, and a voice event.

14. The system of claim 12, wherein the third presence detection data is generated at a first time, and wherein the one or more memories store further instructions that, upon execution by the one or more processors, configure the system to:
determine fourth presence detection data indicating whether the object is present is within the space, wherein the fourth presence detection data is generated at a second time prior to the first time, and wherein the third presence detection data is generated by at least using the fourth presence detection data as an input to the fusion model.

15. The system of claim 14, wherein the one or more memories store further instructions that, upon execution by the one or more processors, configure the system to:
determine fifth presence detection data indicating whether the object is present within the space based at least in part on third sensor data, wherein the fifth presence detection data is generated at the second time, wherein the third sensor data and the first sensor data are generated by a same sensor, and wherein the third presence detection data is generated by at least using the fifth presence detection data as a further input to the fusion model.

16. The system of claim 12, wherein the fusion model comprises a graph-based model that represents each one of the latent variables and the observed variables as a corresponding node and that represents first predetermined data about a latent variable and an observed variable as a first node connection and second predetermined data about a presence detection and the latent variable as a second node connection.

17. The system of claim 16, wherein the graph-based model comprises a dynamic Bayesian network (DBN) that represents a connection between two nodes as a probability, and wherein the third presence detection data corresponds to a node of the DBN and is generated as a function of probabilities.

18. The system of claim 12, wherein the fusion model comprises a neural network model trained using known values of the latent variables and the observed variables.

19. The system of claim 12, wherein the one or more memories store further instructions that, upon execution by the one or more processors, configure the system to:
include, in a training data set, the first presence detection data, the second presence detection data, and the third presence detection data; and
update the fusion model based at least in part on the training data set, wherein the third presence detection data is set as ground truth in the training data set.

20. The system of claim 19, wherein the one or more memories store additional instructions that, upon execution by the one or more processors, configure the system to:
determine that the first sensor data corresponds to a type of sensors; and
determine that the first presence detection data corresponds to a presence detection algorithm, wherein the first presence detection data, the second presence detection data, and the third presence detection data are included in the training data set based at least in part on the type of sensors and the presence detection algorithm.

* * * * *